(12) United States Patent
Vieth et al.

(10) Patent No.: US 9,047,514 B2
(45) Date of Patent: Jun. 2, 2015

(54) APPARATUS, SYSTEM AND METHOD FOR PROJECTING IMAGES ONTO PREDEFINED PORTIONS OF OBJECTS

(71) Applicant: CHRISTIE DIGITAL SYSTEMS CANADA INC., Kitchener (CA)

(72) Inventors: John Vieth, Kitchener (CA); Roy Anthony, Waterloo (CA); Paul Salvini, Kitchener (CA)

(73) Assignee: CHRISTIE DIGITAL SYSTEMS USA, INC., Cypress (*) Notice: Subject to any disclaimer, the term of this patent is extended or adjusted under 35 U.S.C. 154(b) by 0 days.

(21) Appl. No.: 14/109,095

(22) Filed: Dec. 17, 2013

(65) Prior Publication Data

US 2015/0015699 A1  Jan. 15, 2015

Related U.S. Application Data

(63) Continuation-in-part of application No. 13/938,747, filed on Jul. 10, 2013.

(51) Int. Cl.
| | |
|---|---|
| *H04N 5/225* | (2006.01) |
| *G06K 9/00* | (2006.01) |
| *G06T 7/00* | (2006.01) |
| *H04N 9/31* | (2006.01) |
| *H04N 5/74* | (2006.01) |
| *G01B 11/00* | (2006.01) |

(52) U.S. Cl.
CPC .......... *G06K 9/00624* (2013.01); *G01B 11/002* (2013.01); *G06T 7/0057* (2013.01); *H04N 9/3179* (2013.01); *H04N 5/74* (2013.01)

(58) Field of Classification Search
USPC ....................................................... 348/333.1
See application file for complete search history.

(56) References Cited

U.S. PATENT DOCUMENTS

| | | | | |
|---|---|---|---|---|
| 7,187,343 | B2 * | 3/2007 | Pate ............................. | 345/1.2 |
| 7,307,661 | B2 * | 12/2007 | Lieberman et al. ........ | 348/333.1 |
| 8,228,315 | B1 | 7/2012 | Starner et al. | |

(Continued)

OTHER PUBLICATIONS

Parent U.S. Appl. No. 13/938,747, filed Jul. 10, 2013; Inventors: Vieth, John et al. Title: Apparatus, System and Method for Projecting Images Onto Predefined Portions of Objects.
Corresponding European Patent Application No. 14176407.6, "Extended European Search Report", dated Nov. 20, 2014.

*Primary Examiner* — Anthony J Daniels
(74) *Attorney, Agent, or Firm* — Perry + Currier Inc.; Kathy A. Wojtalewicz

(57) ABSTRACT

Apparatus, systems and methods are provided for illuminating objects in a projection area. The system includes a computing device, a projector and a camera. The computing device stores a digital model of an object, and illumination data having lighting parameters and a reference to the digital model. The projector, or another light source, projects structured light onto the projection area, and the camera simultaneously captures an image of the projection area. The computing device receives the captured image, determines a position and orientation of the object by comparing the digital model to the captured image, and then generates a canvas image including a region matching the determined position and orientation of the object. The projector projects the canvas image onto the projection area. A predefined portion of the object corresponding to the reference in the illumination data is thereby illuminated according to the lighting parameters.

18 Claims, 17 Drawing Sheets

(56) References Cited

U.S. PATENT DOCUMENTS

2009/0168027 A1 7/2009 Dunn et al.
2010/0177929 A1 7/2010 Kurtz et al.
2013/0069940 A1* 3/2013 Sun et al. .................. 345/419

* cited by examiner

APPARATUS, SYSTEM AND METHOD FOR PROJECTING IMAGES ONTO PREDEFINED PORTIONS OF OBJECTS

FIELD

The specification relates generally to digital projection systems, and specifically to a method, system and apparatus for projecting digital images onto a projection area, and for illuminating the projection area, and particularly predefined portions of objects in the projection area, adapting for relative movement between the projection system and the objects.

BACKGROUND

Projection systems are typically used to project fixed, predetermined images onto flat, static surfaces. When the surface being projected on is not flat, careful calibration may be required to account for the shape of the surface. Projecting images onto moving objects presents additional complications: moving the projector to track the motion of an object, as with a mobile spotlight, can be cumbersome. When multiple moving objects are involved, multiple projectors are also required, each of which may be required to move independently of the others to track its assigned object.

In addition to the obstacles involved in enabling projection equipment to follow moving objects, the images projected onto those moving objects may still appear distorted. Relative motion between projectors and target objects therefore renders accurate projection difficult to achieve.

SUMMARY

According to an aspect of the specification, a method of illuminating objects in a projection area is provided, comprising: storing, in a memory of a computing device: geometry data defining a digital model of an object; and illumination data containing a record having (i) one or more parameters defining characteristics of light to be projected onto the object, and (ii) a reference to the digital model; controlling a light source connected to the computing device to project structured light onto the projection area; controlling a camera connected to the computing device to capture an image of the projection area during the projection of structured light; receiving the captured image at the computing device from the camera and determining a position and orientation of the object in the projection area by comparing the geometry data to the captured image; generating a canvas image at the computing device, including a region matching the determined position and orientation of the object, the region having a fill defined by the one or more parameters; transmitting the canvas image to a projector connected to the computing device, for projection onto the projection area, whereby a portion of the object corresponding to the reference in the illumination data is illuminated according to the one or more parameters.

According to another aspect of the specification, a computing device configured to perform the method, and a non-transitory computer-readable medium containing instructions for execution on the computing device, are provided.

According to a further aspect of the specification, a system including the computing device, a light source, and the camera are provided.

BRIEF DESCRIPTIONS OF THE DRAWINGS

Embodiments are described with reference to the following figures, in which.

DETAILED DESCRIPTION OF THE EMBODIMENTS

Figure 1:
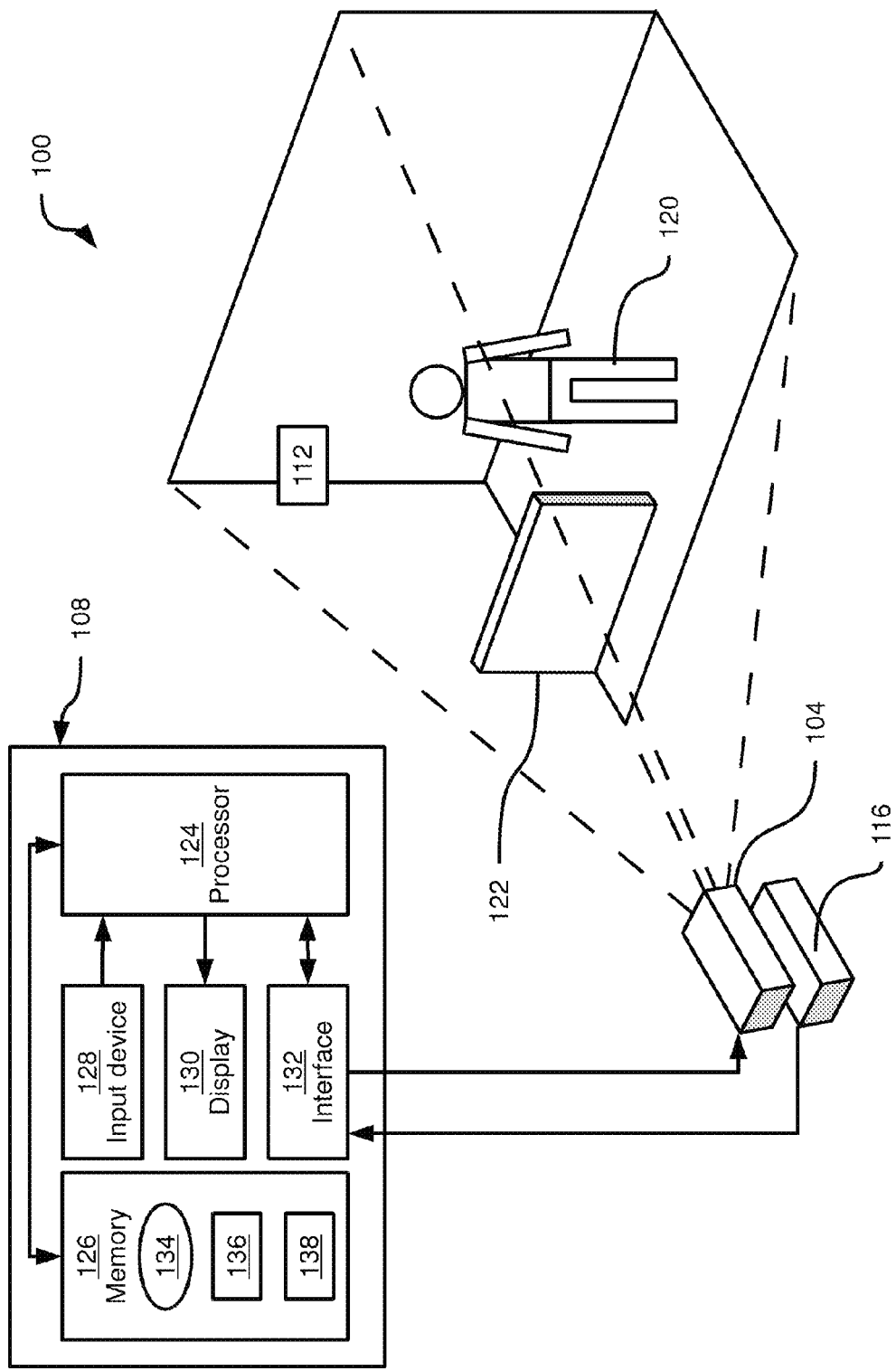
FIG. 1 depicts a system for projecting digital images, according to a non-limiting embodiment.

FIG. 1 depicts a projection system 100 for projecting digital images. System 100 includes one or more projectors, such as a projector 104, arranged to project (illustrated by the dashed lines extending from projector 104) digital images received from a computing device 108 onto a projection area 112. System 100 also includes one or more cameras, such as a camera 116 for capturing images of projection area 112 and sending the captured images to computing device 108. Projector 104 and camera 116 are mounted at known, preferably fixed, positions relative to one another, such that the position of any object in relation to camera 116 can be used to determine the position of that object in relation to projector 104. In addition, the field of view of camera 116 encompasses the entirety of projection area 112; that is, camera 116 is configured to capture images of an area at least as large as the area onto which projector 104 projects light.

As will be discussed in detail herein, projector 104 and computing device 108, in conjunction with camera 116, are configured to project the above-mentioned digital images in such a way that predetermined portions of the images are projected onto one or more objects, such as an object 120 (in the example of FIG. 1, a human subject) in projection area 112. Further, the system is configured to project the images such that those predetermined portions of the images track any relative motion between object 120 and projector 104. As a result, the predetermined portions remain substantially static in relation to object 120, even as object 120 moves within projection area 112. In other words, the predetermined portions of the images are given the appearance of being affixed to specific portions of object 120.

Before discussing the operation of system 100 in detail, the components of system 100 will be described further.

Projector 104 can be any suitable type of projector, or combination of projectors. Projector 104 is stationary in the present example, but can be mobile in other embodiments. Projector 104 thus includes one or more light sources, one or more modulating elements for modulating light from the light sources to produce a desired image provided by computing device 108, and a lens assembly for directing the modulated light onto projection area 112. In some examples, projector 104 can project images using light falling within the spectrum visible to the human eye (that is, wavelengths of about 390 to 700 nm), outside the visible spectrum (for example, infrared light having a wavelength greater than about 750 nm), or both simultaneously.

Camera 116 can be any suitable type of digital camera, and thus includes a lens assembly for focusing reflected light incident on camera 116 from projection area 112. Camera 116 also includes an image sensor onto which the incident light is focused by the lens assembly. Camera 116 is configured to transmit the image data produced by the image sensor to computing device 108.

Computing device 108 can be based on any suitable server or personal computer environment. In the present example, computing device 108 is a desktop computer housing one or more processors, referred to generically as a processor 124, The nature of processor 124 is not particularly limited. For example, processor 124 can include one or more general purpose central processing units (CPUs), and can also include one or more graphics processing units (GPUs). The performance of the various processing tasks discussed herein can be shared between the CPUs and GPUs, as will be apparent to a person skilled in the art.

Processor 124 is interconnected with a non-transitory computer readable storage medium such as a memory 126. Memory 126 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory. In the present example, memory 112 includes both a volatile memory and a non-volatile memory.

Computing device 108 can also include one or more input devices 128 interconnected with processor 124, such as any suitable combination of a keyboard, a mouse, a microphone, and the like. Such input devices are configured to receive input and provide data representative of such input to processor 108. For example, a keyboard can receive input from a user in the form of the depression of one or more keys, and provide data identifying the depressed key or keys to processor 124.

Computing device 108 further includes one or more output devices interconnected with processor 124, such as a display 130 (e.g. a Liquid Crystal Display (LCD), a plasma display, an Organic Light Emitting Diode (OLED) display, a Cathode Ray Tube (CRT) display). Other output devices, such as speakers (not shown), can also be present. Processor 124 is configured to control display 130 to present images to a user of computing device 108.

Computing device 108 also includes a data interface 132 interconnected with processor 124, for carrying data from processor 124 to projector 104, and for carrying data from camera 116 to processor 124. The nature of interface 132 is not particularly limited. In general, interface 132 includes the necessary hardware elements to enable communications between computing device 108 and projector 104 and camera 116. Interface 132 can also include multiple interfaces, for example if different communication technologies are used by projector 104 and camera 116.

Computing device 108 is configured to perform various functions, to be described herein, via the execution by processor 124 of applications consisting of computer readable instructions maintained in memory 126. Specifically, memory 126 stores an application 134 including computer-readable instructions executable by processor 124. When processor 124 executes the instructions of application 134, processor 124 is configured to perform various functions in conjunction with the other components of computing device 108, and with projector 104 and camera 116. Processor 124 is therefore described herein as being configured to perform those functions via execution of application 134. In the discussion below, when computing device 108 generally, or processor 124 specifically, are said to be configured to perform a certain action or function, it will be understood that the performance of the action or function is caused by the execution of application 134 by processor 124.

Memory 126 also stores geometry data 136 identifying geometrical features of various objects that can appear in projection area 112, and image data 138 defining one or more images that can be projected onto projection area 112 (by projector 104, under the control of computing device 108).

Figure 2:
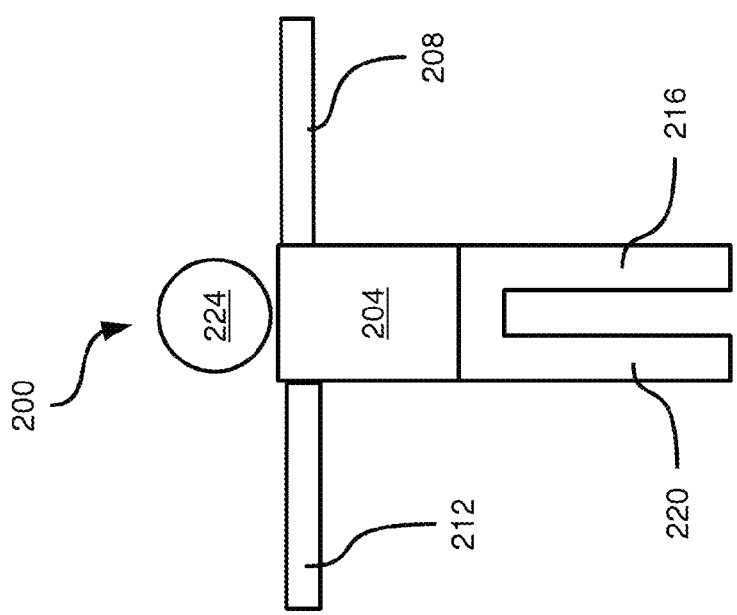
FIG. 2 depicts geometry data maintained in the system of FIG. 1, according to a non-limiting embodiment.

Turning to FIG. 2, an example of geometry data 136 is provided. Specifically, geometry data 136 in the present example identifies geometrical features of object 120 (the human subject) shown in FIG. 1. In other words, geometry data 136 defines a digital model of object 120. The model is preferably in three dimensions, but in other examples, geometry data 136 can be simplified by defining a model in only two dimensions, even for a three dimensional object. It will now be apparent that geometry data 136 does not define a model for another object, object 122 (a short wall placed in projection area 112, as seen in FIG. 1). In the present example, this is because object 122 is assumed to not be an object "of interest" (that is, an object onto which digital images are to be projected). In general, geometry data 136 contains predefined models for any objects onto which digital images are to be projected, but does not define models for other objects.

FIG. 2 shows a three dimensional model 200 of object 120, as defined by geometry data 136. FIG. 2 also shows an example of geometry data 136 itself. As seen in FIG. 2, geometry data 136 includes a plurality of records each identifying features of a certain part of object 120. In the present example, where object 120 is a human subject, geometry data 136 includes one record for each of the following parts: a torso 204 (modeled as a rectangular prism having a height of 50 cm, a width of 30 cm, and a depth of 20 cm); left and right arms 208 and 212 (each modeled as a cylinder having a length of 75 cm and a radius of 5 cm); left and right legs 216 and 220 (each modeled as a cylinder having a length of 100 cm and a radius of 10 cm); and a head 224 (modeled as a sphere having a radius of 12 cm). The above list of parts, and their dimensions, are provided solely for illustrative purposes—a wide variety of parts and dimensions can be provided in geometry data 136.

Geometry data 136 also defines the connections between various parts. For example, as seen in the "connections" column of geometry data 136, all the parts other than torso 204 are marked as being connected to torso 204. Although not shown in FIG. 2, geometry data 136 can include coordinates or other identifications of where the connections between parts are. Geometry data 136 can also include a wide variety of other data, such as permissible ranges of motion of various parts relative to other parts, and the like. Model 200 of object 120 is simplified for illustrative purposes, but it is contemplated that geometry data 136 can define a more complex model of object 120, including individual segments of limbs, and including more detailed shape data than the prisms shown in FIG. 2. For example, geometry data 136 may define a wire-frame model divided into any number of parts, each part including a plurality of surfaces joined by edges.

It is also contemplated that any suitable format can be used to store geometry data 136. That is, although geometry data 136 is shown in a tabular format in FIG. 2, a wide variety of other formats can also be used. The technology used to acquire or create geometry data 136 is also not particularly limited. For example, any suitable computer aided design (CAD) software can be used to generate geometry data. In other examples, geometry data 136 can be generated by scanning object 120 itself, using depth-mapping, LIDAR, multi-camera 3D imaging, light field camera imaging, structured light imaging, or other suitable technologies.

Figure 3:
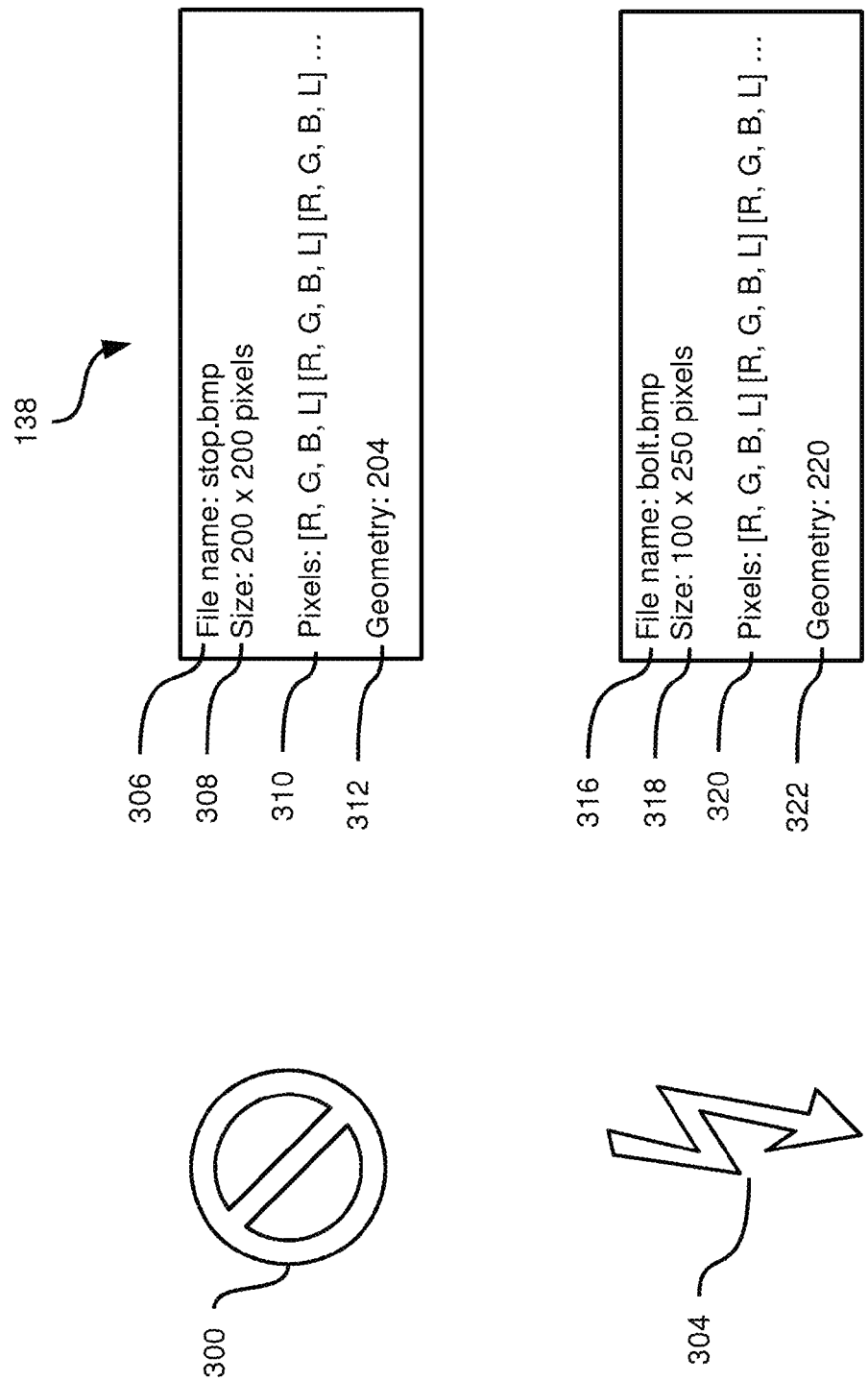
FIG. 3 depicts image data maintained in the system of FIG. 1, according to a non-limiting embodiment.

Turning now to FIG. 3, an example of image data 138 will be discussed. Image data 138, in the present example, defines two images, 300 and 304. Each image is stored in memory 126 as an image file. The image files that constitute image data 138 each include various types of data, which can be organized in fields or other suitable data structures. The types of data can include a file name, used by computing device 108 to identify and retrieve the image; metadata, such as an image size, date of creation (not shown) and the like; colour and brightness data; and a reference to geometry data 136, also referred to as mapping metadata.

Thus, image 300 is defined by a file including a file name field 306 ("stop.bmp") and an image size field 308 specifying the size of image 300 (two hundred by two hundred pixels). It is contemplated that image size field 308 can be omitted, or can be presented in a different manner (for example, rather than or in addition to pixel-based size, one or both of an aspect ratio and a total number of pixels can be specified). Image 300 is also defined by colour and brightness data 310 in the form of a pixel array. Each pixel in the array includes three colour values (one for each of a red channel "R", a green channel "G", and a blue channel "B") and one brightness value ("L"). In the present example, the pixel array 310 includes forty thousand pixels (not all shown), corresponding to the dimensions specified in field 308. A wide variety of types of colour and brightness data are contemplated. For example, image 300 may be defined by vector data rather than by individual pixel values. In some examples, even when pixel arrays are used, compression algorithms may be used to reduce the number of individual pixels which must be defined in the image file. In addition, red, green, blue and brightness values can be substituted by any other suitable colour model (e.g. CMYK).

Further, the file defining image 300 includes a mapping metadata field 312, which refers to a part of model 200 as discussed earlier. Mapping metadata field 312 is used to determine the placement of image 300 on object 120 when image 300 is projected onto projection area 112 by projector 104. Mapping metadata field 312 can also include additional data specifying the orientation of image 300 with respect to torso 204, as well as the exact location on torso 204 of image 300 (for example, by way of coordinates or distances from specified edges of torso 204).

Image 304 is defined by a file having analogous components to those discussed above. Thus, the file defining image 304 includes a file name field 316, a size field 318, a pixel array 320, and a mapping metadata field 322.

It is contemplated that in some examples, individual pixels or blocks of pixels (in raster, or bitmap, images as shown in FIG. 3) or vector data (in vector images, not shown) can include mapping metadata, rather than mapping metadata being confined to a separate field from the pixel arrays 310 and 320. That is, certain pixels can be mapped to a particular portion of geometry data 136. In general, therefore, image data 138 includes mapping metadata referring to at least a portion of geometry data 136. In addition, although the example image data in FIG. 3 defines two static images, image data 138 can also define a motion picture in the form of a sequence of images or a video stream.

Figure 4:
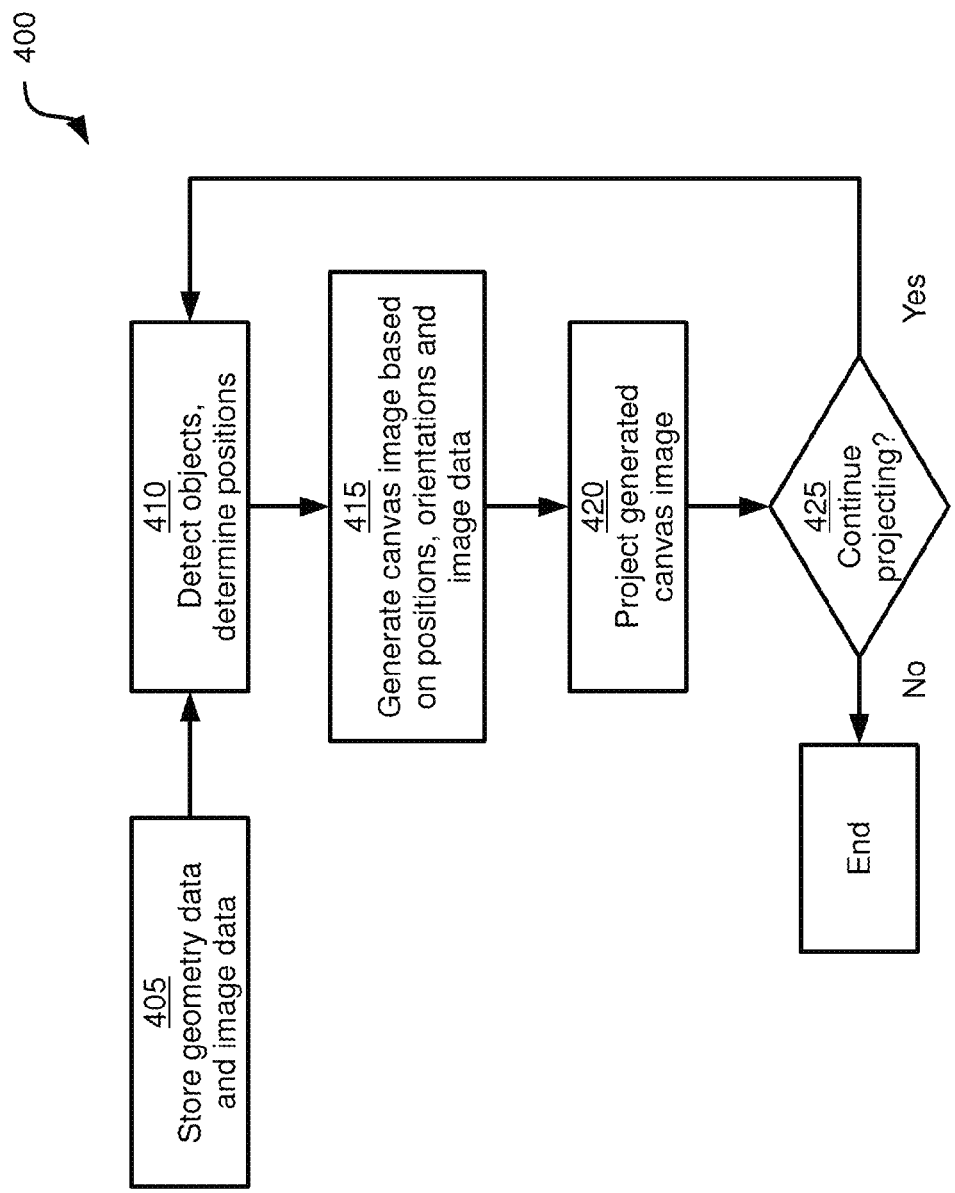
FIG. 4 depicts a method of projecting digital images, according to a non-limiting embodiment.

Having described the components of system 100, the operation of system 100 will now be described in detail, with reference to FIG. 4. FIG. 4 depicts a method 400 of projecting images onto projection area 112. The performance of method 400 will be discussed in conjunction with its performance in system 100, although it is contemplated that method 400 can also be performed by other suitable systems.

Method 400 begins at block 405, at which computing device 108 is configured to store geometry data 136 and image data 138, as discussed above. It is contemplated that geometry data can be stored for a wide variety of objects, including object 120, onto which images are to be projected when such objects are present in projection area 112. Further, it is contemplated that image data can be stored for a wide variety of images, which can refer to any combination of the objects described by geometry data 136. In addition, as mentioned earlier image data 138 can also specify a sequence for the various images defined therein, for example when a slideshow or video is to be projected onto projection area 112. In such cases, each image file can include a sequence number, or image data 138 can include a video file including several image sub-files in a particular sequence. For the present example performance of method 400, however, geometry data 136 and image data 138 are assumed to be as described earlier herein (that is, defining a single object and two images).

Proceeding to block 410, computing device 108 is configured to detect any objects within projection area 112 that correspond to geometry data 136, and to determine the position and orientation of each detected object relative to projector 104. A variety of methods for identifying and determining the position and orientation of objects within projection area 112 are contemplated. For example, a depth mapping apparatus (not shown), such as a LIDAR apparatus, can be connected to computing device 108 and can generate a depth map of projection area 112. Computing device 108 can then determine whether any objects described by geometry data 136 are present in the depth map. Other range-finding and depth-mapping apparatuses can also be implemented.

In other examples, such range-finding or depth mapping technologies can be replaced by, or supplemented with, location-finding technologies such as a GPS receiver (not shown) affixed to object 120 which determines its location and transmits the location to computing device 108.

Figure 5:
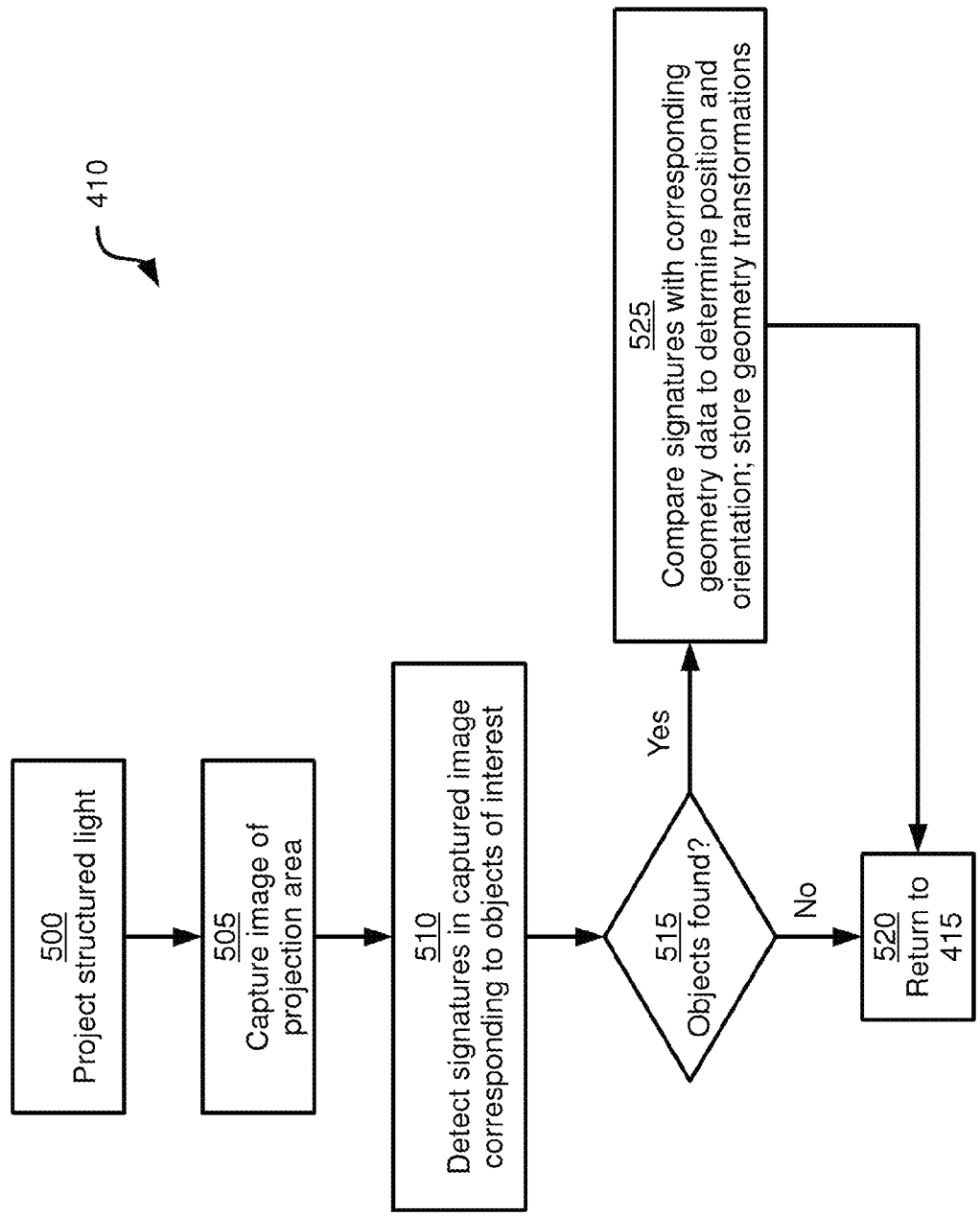
FIG. 5 depicts a method of performing block 410 of the method of FIG. 4, according to a non-limiting embodiment.

In the present example, the performance of block 410 involves both projector 104 and camera 116, as will be discussed in connection with FIG. 5. FIG. 5 depicts an example performance of block 410 of method 400. Beginning at block 500, computing device 108 is configured to control projector 104, or another light source separate from projector 104 (not shown), to project a structured light pattern onto projection area 112. The nature of the structured light is not particularly limited. Structured light projections can include an arrangement of parallel lines of light, grids of light, Gray-code patterns, full frames of light, and the like. In general, the structured light projected at block 500 is selected such that portions of the structured light that are reflected back from projection area 112 can be captured by camera 116 and used by computing device 108 to determine object positions and orientations, as will be discussed below.

Figure 6:
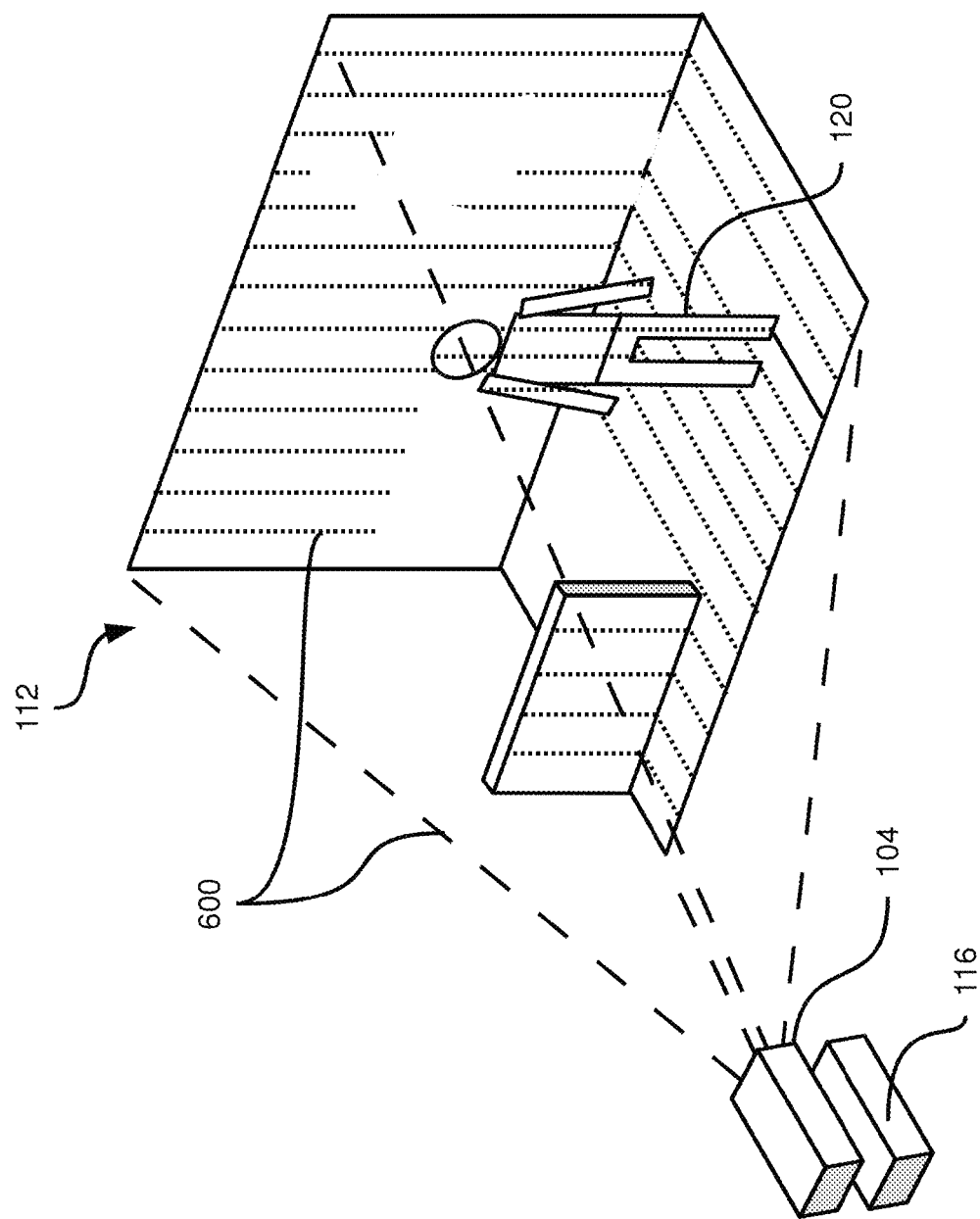
FIG. 6 depicts the projection of structured light as part of the method of FIG. 5, according to a non-limiting embodiment.

An example of structured light 600 is shown in FIG. 6 as a series 600 of parallel lines of light projected onto projection area 112. As seen in FIG. 6, objects 120 and 122 (and indeed, any other object in projection area 112) obstruct portions of structured light 600. The parallel lines shown in FIG. 6 are provided simply for the purposes of illustration—any suitable pattern of structured light can be used at block 500.

In the present example, structured light 600 is projected by projector 104 itself, as projector 104 is well suited to generating structured light 600 using the same light modulation technology as is used for projector 104's primary purpose of projecting digital images. Structured light 600 can be either visible or invisible light (that is, within the spectrum visible by human observers, or outside the visible spectrum). As mentioned earlier, projector 104 can therefore be capable of projecting both visible and invisible light; an example of such a projector is provided in US Published Patent Application No, 2010/0110308. When structured light 600 is within the visible spectrum, it can nevertheless be made invisible to human observers by being projected at block 500 for a time period sufficiently short as to be imperceptible to observers. As demonstrated in the practice of subliminal messaging in motion pictures, when the duration of the structured light intervals are sufficiently short, they are below the threshold of conscious perception by humans.

Returning to FIG. 5, at block 505 computing device 108 is configured to control camera 116 to capture an image of projection area 112. When structured light 600 is projected for only a certain time interval (as in the scenario using visible light described above), the shutter of camera 116 is synchronized to open only during the interval for which structured light 600 is projected. Synchronization can be provided by a wired or wireless signal from computing device 108, such that the image is captured by camera 116 at block 505 during the projection of structured light 600 on projection area 112. As a result, the effect on the captured image of any ambient light and of any projected imagery on projection area 112 is minimized, and the captured image includes any portions of structured light 600 reflected from projection area 112 back towards camera 116. The shutter speed with which camera 116 captures the image at block 505 is not particularly limited, but is sufficiently high to avoid motion blurring in the captured image due to movement of object 120. The image captured at block 505 is provided to computing device 108 for storage in memory 126, for further processing.

Figure 7:
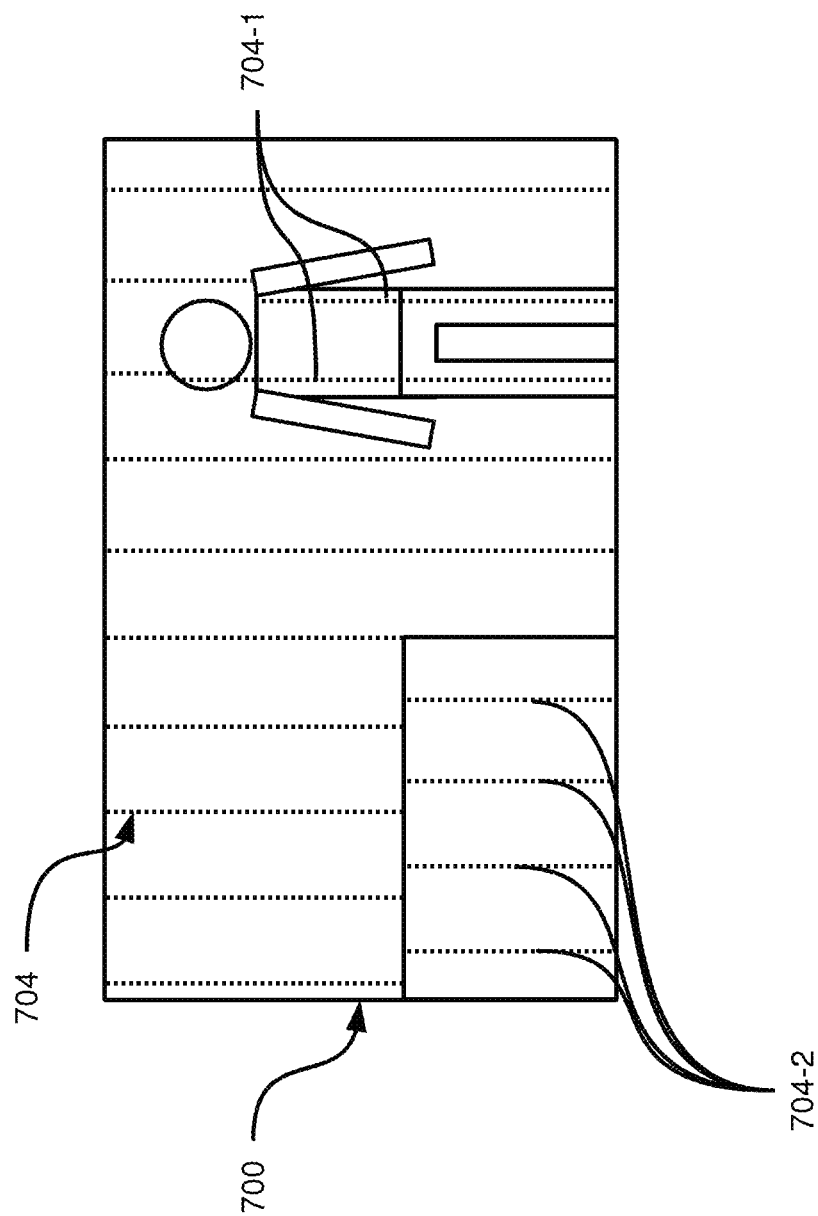
FIG. 7 depicts an image captured by performing the method of FIG. 5, according to a non-limiting embodiment.

The image captured by camera 116 and sent to computing device 108 at block 505 is shown in FIG. 7 as image 700. Image 700 includes signatures 704 which are reflected portions of structured light 600 that are indicative of obstructions to structured light 600. Subsets 704-1 and 704-2 of signatures 704 are reflections from objects 120 and 122, respectively. Image 700 shows objects 120 and 122 in addition to signatures 704, although in other examples, camera 116 can be configured to capture only signatures 704 by way of a filter or sensitivity threshold. In such examples, only signatures 704 would be visible, whereas the outlines of objects 120 and 122 would not be visible in image 700.

Having received image 700, computing device 108 is then configured to perform block 510 as shown in FIG. 5. At block 510, computing device 108 is configured to process image 700 to detect signatures that correspond to objects of interest, that is, objects defined by geometry data 136. To perform block 510, computing device 108 is thus configured to determine which ones, if any, of signatures 704 correspond to which portions of geometry data 136. In the present example, signatures 704-1 correspond to geometry data 136, while signatures 704-2 do not correspond to any of geometry data 136. In other words, the detection performed at block 510 indicates which objects of interest are within the field of view of camera 116.

Having performed the detection at block 510, computing device 108 is configured to take different courses of action based on whether or not signatures corresponding to objects defined by geometry data 136 were detected in image 700. At block 515, if no signatures corresponding to objects of interest were detected at block 510, computing device 108 is configured to return to block 415 of method 400. If, however (as in the present example performance of method 400) signatures corresponding to an object defined by geometry data 136 were detected at block 510, computing device 108 performs block 525.

Figure 8:
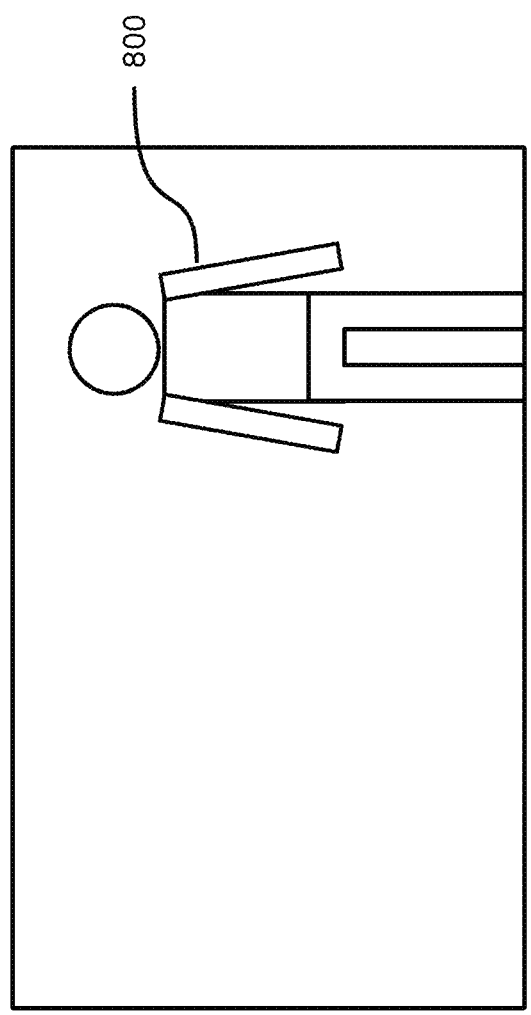
FIG. 8 depicts the results of the performance of block 525 of the method of FIG. 5, according to a non-limiting embodiment.

At block 525, computing device 108 is configured to compare the signatures 704 corresponding to objects of interest with geometry data 136, to determine the position and orientation of those detected objects relative to camera 116. In the present example, computing device 108 therefore compares signatures 704-1 to geometry data 136, while signatures 704-2 are ignored. The determined position and orientation can be stored as data representing transformations that, when applied to geometry data 136, define a transformed version of model 200 (compared to the "neutral" version of model 200 shown in FIG. 2) that substantially matches the current position and orientation of object 120. A transformed version 800 of model 200 resulting from block 525 is shown in FIG. 8. When the performance of block 525 is complete, computing device 108 is configured to return to block 415 of method 400.

The nature of the technologies used to perform blocks 510 and 525 is not particularly limited, and generally enables computing device 108 to determine which objects of interest are present in the field of view of camera 116, and what the position and orientation of those objects are. Various machine vision techniques will now occur to those skilled in the art, such as motion capture processing techniques used in film production. Nonlimiting examples of such techniques are shown in the following publications: U.S. Pat. No. 6,064,759; and PCT Published Patent Application Nos. 2009/120073 and 2009/032641. Additional information and alternative techniques can be found in US Published Patent Application Nos. 2008/0036580 and 2012/0087573, and PCT Published Patent Application No. WO 2007/050776.

At block 415, computing device 108 is configured to generate a "canvas" image, based on the position and orientation determined at block 525, and based on image data 138. The canvas image generated at block 415 is an image to be projected by projector 104 onto projection area 112 as a whole (as shown by the dashed lines in FIG. 1), and not only onto object 120 or other objects in projection area 112. In order to generate the canvas image, computing device 108 is configured to retrieve any portions of image data 138 that refer to objects of interest detected at block 510, and to generate modified versions of those retrieved portions of image data 138 by applying the same transformations that were determined and stored at block 525.

In the present example performance of method 400, signatures 704-1 were determined to correspond to object 120 (more specifically, to model 200 as defined by geometry data 136) at block 510. Therefore, computing device 108 is configured at block 415 to retrieve any portions of image data 138 that contain references to model 200 in geometry data 136. Because both files in image data 138 contain references to model 200, in the present example, images 300 and 304 are both retrieved at block 415.

Figure 9:
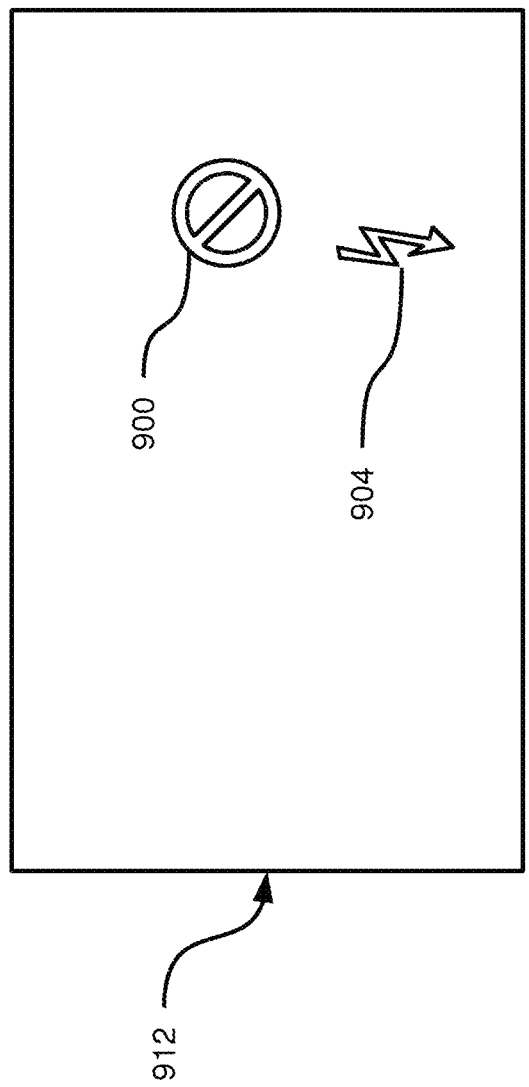
FIG. 9 depicts a canvas image generated at block 415 of the method of FIG. 4, according to a non-limiting embodiment.

Having retrieved the relevant images from image data 138, computing device 108 is configured to generate modified versions of images 300 and 304 to match the detected position and orientation of object 120, and to position the modified images on a digital canvas—that is, to place the modified images as portions of a single larger canvas image. Turning to FIG. 9, modified versions 900 and 904 of images 300 and 304, respectively, are shown as portions of a canvas image 912. The positions of modified versions 900 and 904 within canvas image 912 have been set to match the positions of torso 204 and right leg 220 of model 200 determined from image 700. In addition, modified versions 900 and 904 have been transformed to match the orientation of model 200. The same transformations as those determined at block 525 are applied to images 300 and 304 to generate modified images 900 and 904. Such transformations can include skewing, scaling, rotation, cropping for partial display, and the like.

Figure 10:
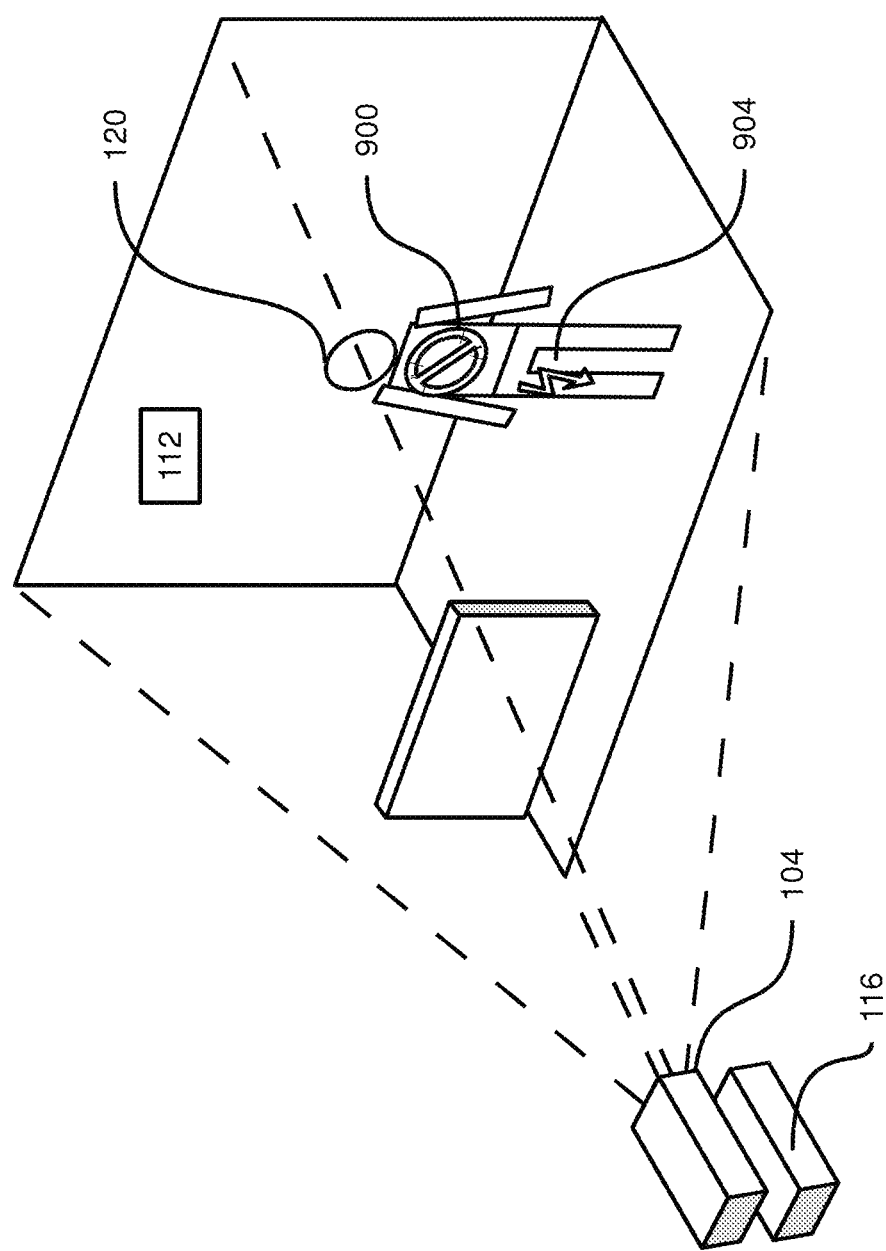
FIG. 10 depicts the performance of block 420 of the method of FIG. 4, according to a non-limiting embodiment.

Returning to FIG. 4, the performance of method 400 proceeds to block 420, at which computing device 108 is configured to control projector 104 to project canvas image 912 generated at block 415 onto projection area 112. The performance of block 420 therefore involves sending canvas image 912 from computing device 108 to projector 104 via interface 132. Having received canvas image 912 from computing device 108, projector 104 projects canvas image 912 onto projection area 112. As seen in FIG. 10, the result of the performance of block 420 is the projection of modified versions 900 and 904 within canvas image 912 onto object 120 such that modified versions 900 and 904 match the position and orientation of object 120, without any movement being required by projector 104 to account for the position and orientation of object 120.

The performance of method 400 then proceeds to block 425, at which computing device 108 determines whether or not to continue the projection of images onto projection area 112. As mentioned earlier, a sequence of images can be defined by image data 138, such that a video is projected onto projection area 112. For example, one or both of images 300 and 304 (and thus modified versions 900 and 904) can be animated, or can be segments of video encapsulated within an arbitrary predefined peripheral frame. In such examples, canvas image 912 is updated (that is, the performance of block 425 is repeated) at least at the frame rate defined by the video or animation. In other examples, image data 138 may define a length of time for which certain images are to be projected. For example, images 300 and 304 may include metadata specifying that they are to be projected continuously for one hour. In still other examples, system 100 may be configured to continue projecting the same images indefinitely, until input data is received at computing device 108 halting the projection or altering the image data to be projected. Combinations of the above examples are also contemplated.

In the present example, it will be assumed that computing device 108 is configured to cause continuous projection of images 300 and 304 (transformed as necessary, per the discussion above). Therefore, the determination at block 425 is affirmative, and computing device 108 repeats the performance of blocks 410-420, thus projecting another "frame".

Figure 11:
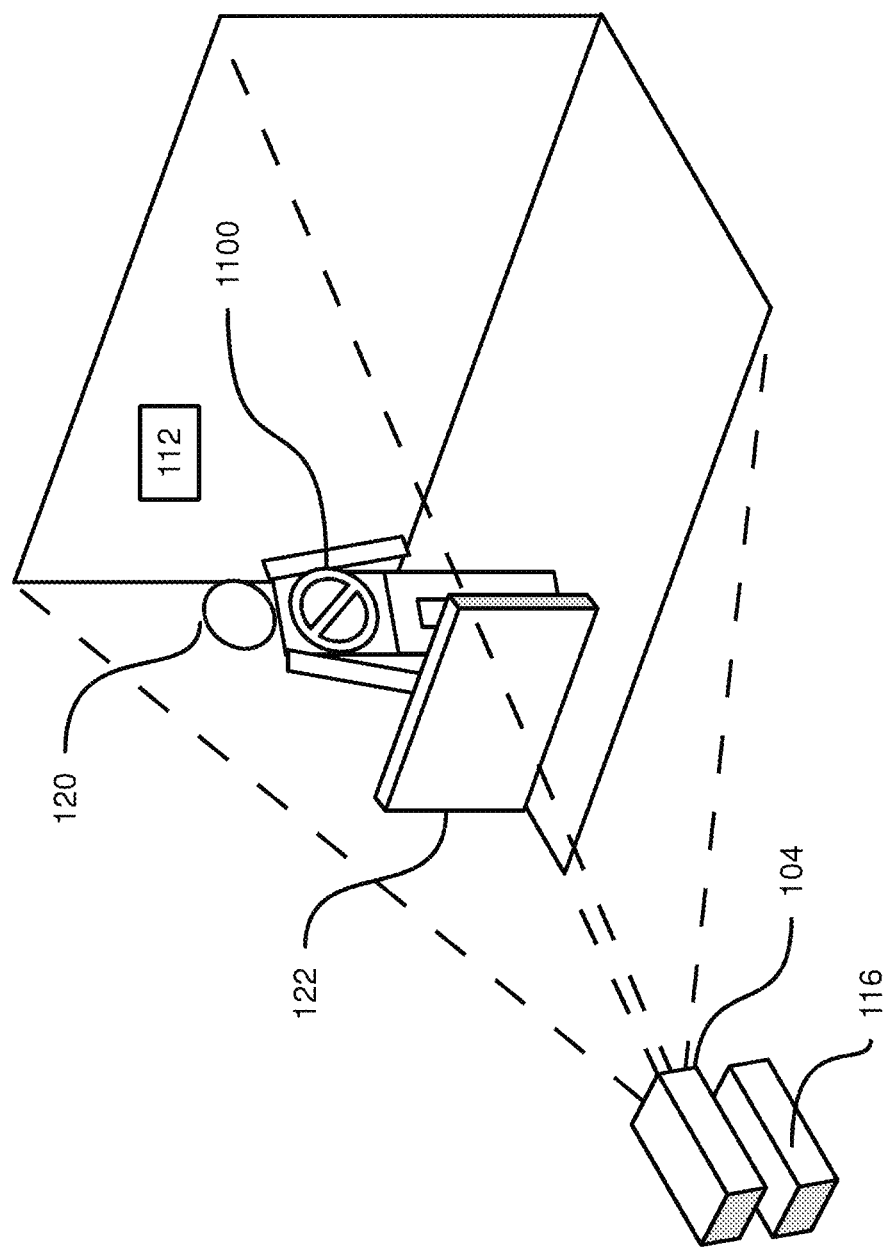
FIG. 11 depicts another performance of block 420 of the method of FIG. 4, according to a non-limiting embodiment.

Although the same images are projected, their positions and orientations may change to account for relative movement between object 120 and projector 104. FIG. 11 shows an example of a subsequent performance of method 400, in which object 120 has moved to a different location within projection area 112, and in which no modified version of image 304 is projected due to the right leg of object 120 (corresponding to right leg 220 of model 200) not being visible to camera 116 (note that a modified version of image 304 is not projected onto object 122). Instead, only a modified version 1100 of image 300 is projected, at a position and orientation matching the detected position and orientation of torso 204 (modified version 1100 is of a different size and is skewed at a different angle than modified version 900).

The frequency of repetition of blocks 410-425 is not particularly limited. In the present example, the frequency is sufficiently high as to provide substantially real-time tracking of object 120. Thus, blocks 410-425 may be performed from about sixty to about one hundred and twenty times per second (that is, about thirty separate canvas images are generated per second). The above range is merely illustrative; higher and lower frame rates are also contemplated, depending on the processing power of computing device 108 and on the particular situation for which system 100 is to be used.

When the performance of method 400 is repeated as discussed above, the projection of a canvas image at block 420 and the projection of structured light at block 500 can be substantially simultaneous, or can alternate. For example, when projector 104 is capable of projecting visible and invisible light simultaneously, a canvas image can be projected at the same time as the structured light which will be used to generate the next canvas image. In other examples, the structured light may be projected in between frames (that is, in between projected canvas images), with each frame of structured light being used to generate the subsequent canvas image.

Figure 12:
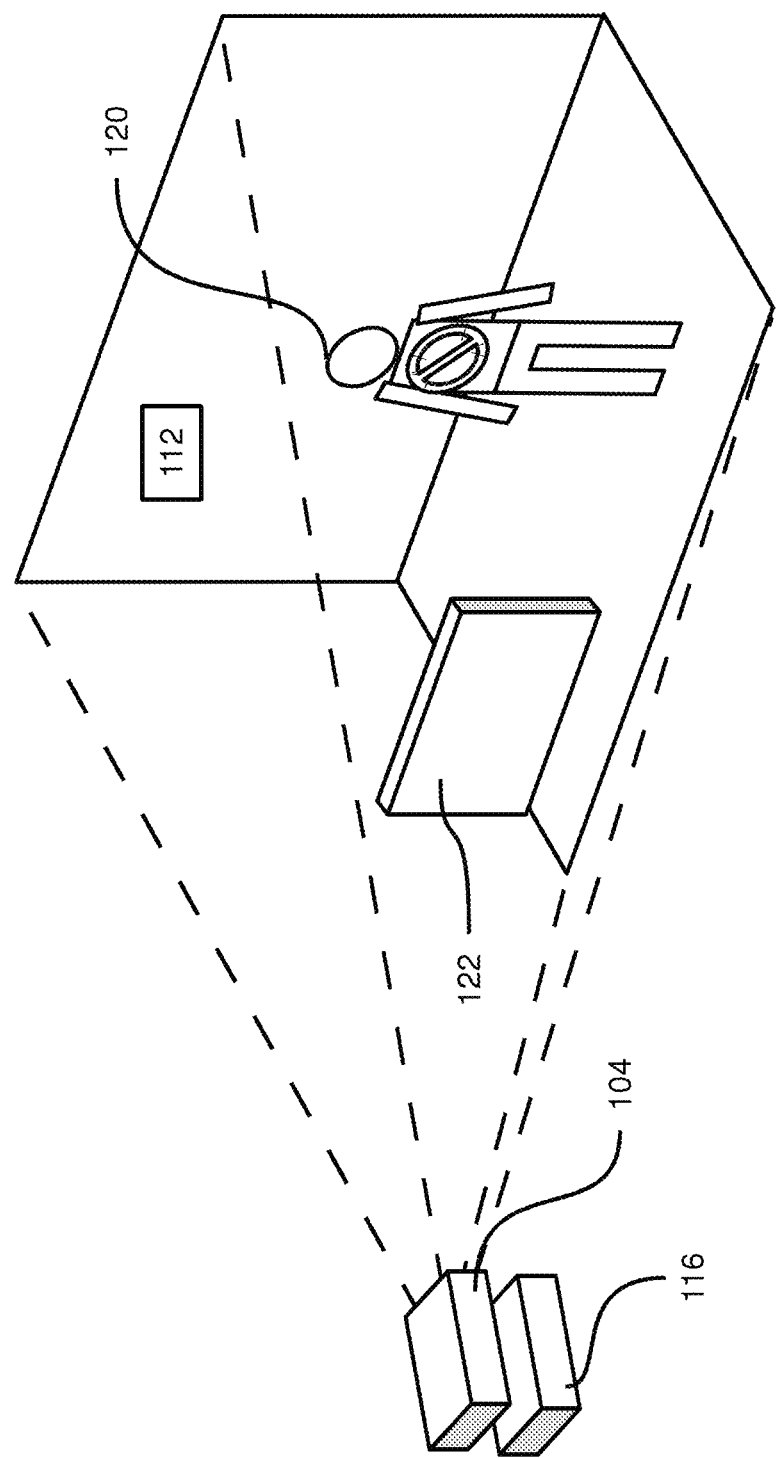
FIG. 12 depicts another performance of the methods of FIGS. 4 and 5 following movement of the camera and projector of FIG. 1.

Thus, as set out above, system 100 allows for images to be projected, as portions of a canvas image, onto specific objects in projection area 112, accounting for relative motion between the objects and projector 104. Although projector 104 is described above as being preferably stationary, the principles described herein can be applied to account for projector movement as well as object movement. For example, in FIG. 12 projector 104 and camera 116 have been moved in relation to projection area 112. As a result, object 122 obscures the right leg of object 120 from the view of camera 116. As a result, image 304 is not projected.

In addition to the variations described above, additional variations to system 100 and method 400 are also contemplated. For example, one or both of projector 104 and camera 116 can be replaced with multiple projectors or multiple cameras. For example, the size of projection area 112 may be such that several projectors are required to provide complete projection coverage, and such that several cameras are required to capture a complete image of projection area 112. In such embodiments, computing device 108 can be configured to divide canvas image 912 among an array of projectors, and can also be configured to generate image 700 as a composite of multiple images received from an array of cameras.

In another variation, two types of projectors can be provided in system 100. One type can be used to project structured light 600, while the other type can be used to project canvas image 912. As mentioned in the previous paragraph, either a single projector of each type, or multiple projectors of each type, can be provided.

Figure 13:
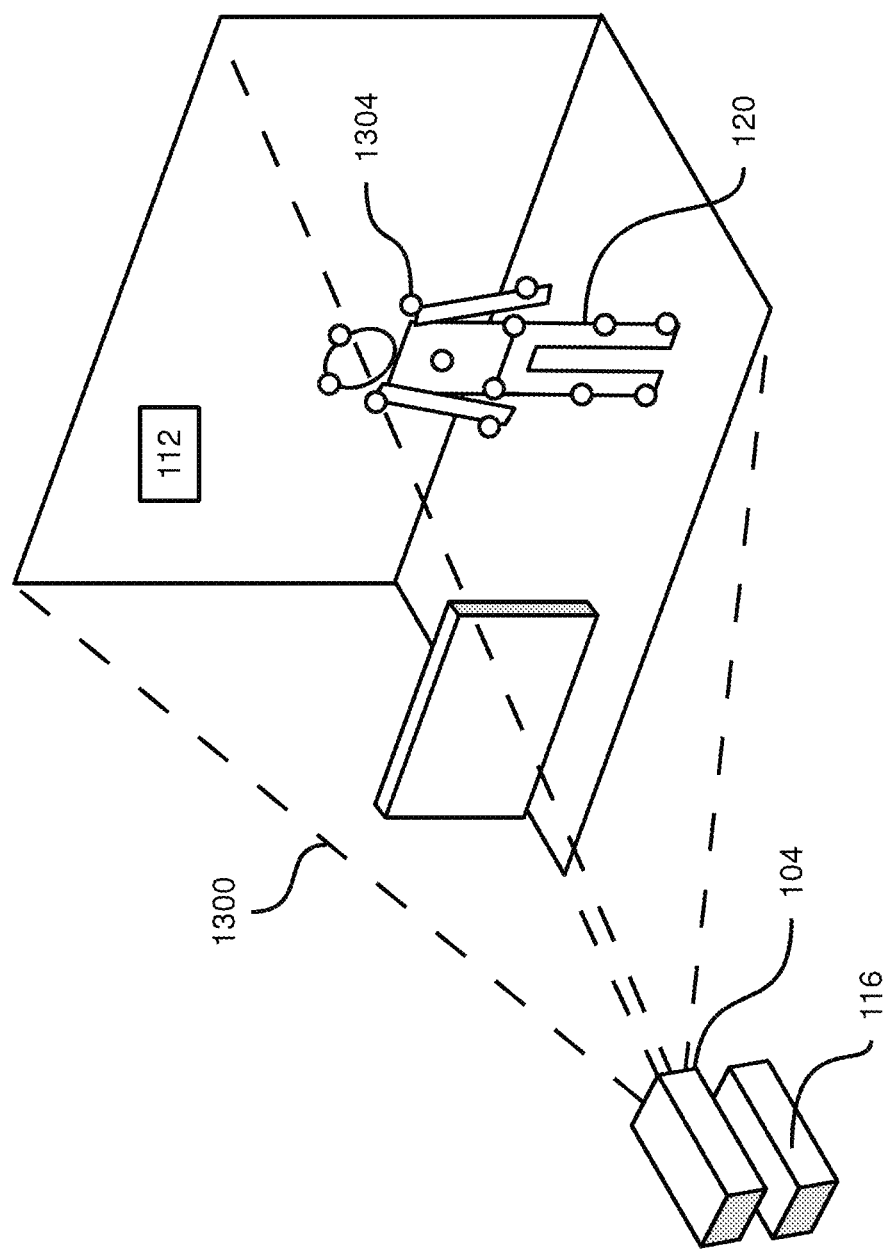
FIG. 13 depicts another example of structured light used in the method of FIG. 5, according to a non-limiting embodiment.

In a further variation, reflective markers can be affixed to objects of interest, such as object 120, in projection area 112, in order to enhance the accuracy of the determinations at blocks 510 and 525 by reducing the impact of occlusions and shadows in projection area 112. FIG. 13 shows an example of system 100 in which projector 104 projects structured light in the form of a full frame of infrared or other light 1300, and in which object 120 carries a plurality of markers 1304 that reflect light 1300. In this variation, the signatures described above are provided by reflections from markers 1304 captured by camera 116.

In a further variation to the example of FIG. 13, different types of markers 604 can be fixed to different objects of interest. For example, markers having certain reflective properties can be fixed to one object, while markers having different reflective properties can be fixed to another object. Such an implementation can reduce the computational resources required to detect different objects and determine the position and orientation of those objects.

In other embodiments, system 100 can be configured to control the illumination of various objects in projection area 112, rather than to project image data onto those objects. Illumination as used herein refers to the projection of light without predefined spatial variations onto an object (although there may be predefined spatial variations for projection area 112 as a whole, due to different illumination parameters for different objects). For example, rather than projecting image 300 (which has spatial variations in colour and brightness defined by pixel array 310) onto a given object, illuminating that object may consist of projecting light having the same colour, brightness, and other attributes onto the entirety of that object. The distinction between image projection and illumination will become apparent to those skilled in the art in the discussion below.

Figure 14:
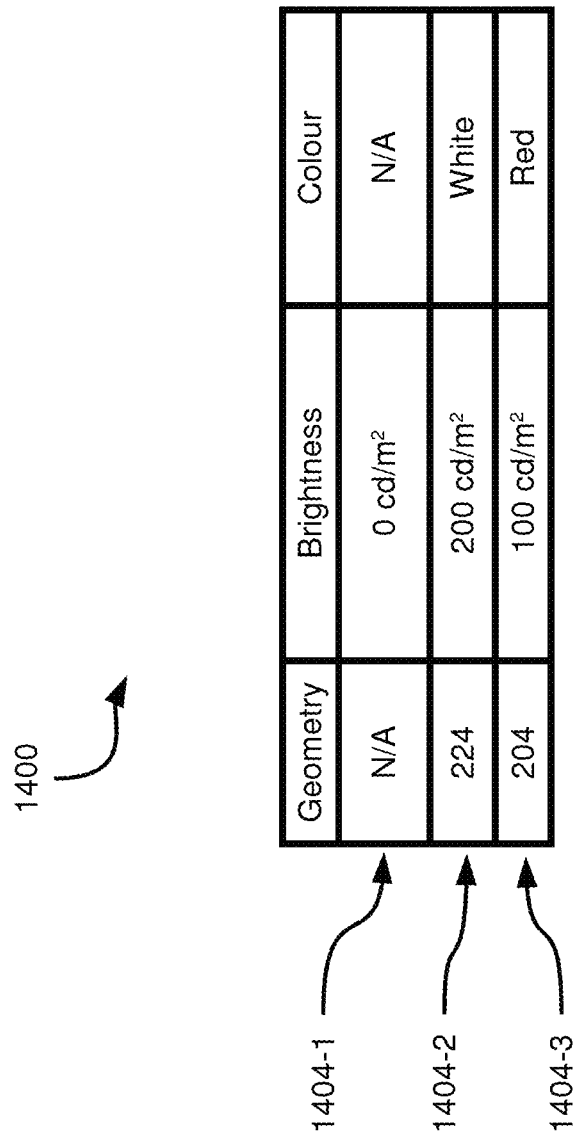
FIG. 14 depicts illumination data maintained in the system of FIG. 1, according to another non-limiting embodiment.

In embodiments configured to control illumination of objects rather than image projection, computing device 108 is configured to store illumination data in memory 126 rather than image data 138. Turning to FIG. 14, an example of illumination data 1400 is shown. Illumination data 1400 can be formatted in any suitable manner, and is not limited to the tabular format illustrated. Illumination data 1400 defines one or more records 1404-1, 1404-2, and 1404-3, illustrated in FIG. 14 as rows in the table. Each record 1404 defines how one or more objects within projection area 112 will be illuminated.

Each record 1404 in illumination data 1400 contains a reference to geometry data 136, and one or more parameters defining the characteristics of the light to be projected onto the object or objects corresponding to the reference. In the example of FIG. 14, record 1404-1 contains a blank or null reference to geometry data 136, record 1404-2 contains a reference to head 224 of model 200, and record 1404-3 contains a reference to torso 204 of model 200. A wide variety of other references to geometry data 136 are contemplated. For example, a single given record can refer to model 200 as a whole, or to multiple models or parts.

The null reference of record 1404-1 indicates that record 1404-1 defines the illumination of any portion of projection area 112 that is not occupied by an object referenced elsewhere in illumination data 1400. This includes both objects that are defined in geometry data 136 but not referred to in records 1404, and objects that are not defined in geometry data 136.

To illustrate the effects of the references in records 1404, refer briefly to projection area 112 as shown in FIG. 1. In that arrangement of projection area 112, according to illumination data 1400 the head and torso of object 120 will be illuminated according to records 1404-2 and 1404-3 respectively, while the remainder of projection area 112 (including object 122, the background, and the legs and arms of object 120) will be illuminated according to record 1404-1.

As mentioned earlier, each record 1404 also includes parameters defining illumination characteristics. For example, as shown in FIG. 14, each record specifies a brightness and a colour of light to illuminate the relevant objects. The brightness can be specified in a variety of formats. In the present example, each record 1404 specifies a target brightness in nits (also referred to as candela per square meter, $cd/m^2$) for the object or objects identified in that record 1404. Other units, such as foot-lamberts (fL or ft-L), can also be used. The target brightness. In some other examples, brightness can instead be specified in records 1404 as a fraction of the maximum output of projector 104. The colour can be represented in a variety of ways, including the English names shown in FIG. 14, which can then be converted by processor 124 into a suitable colour model (e.g. RGB, CMYK). In other examples, the colour can be represented in records 1404 in the colour model, instead of in corresponding English names. As seen in record 1404-1, when the target brightness is zero (that is, the relevant object is to be left dark), the colour parameter can be omitted.

The brightness parameters described above are used by processor 124 to control the output of projector 104 in order to achieve the specified target brightness for each object in projection area 112.

Figure 15:
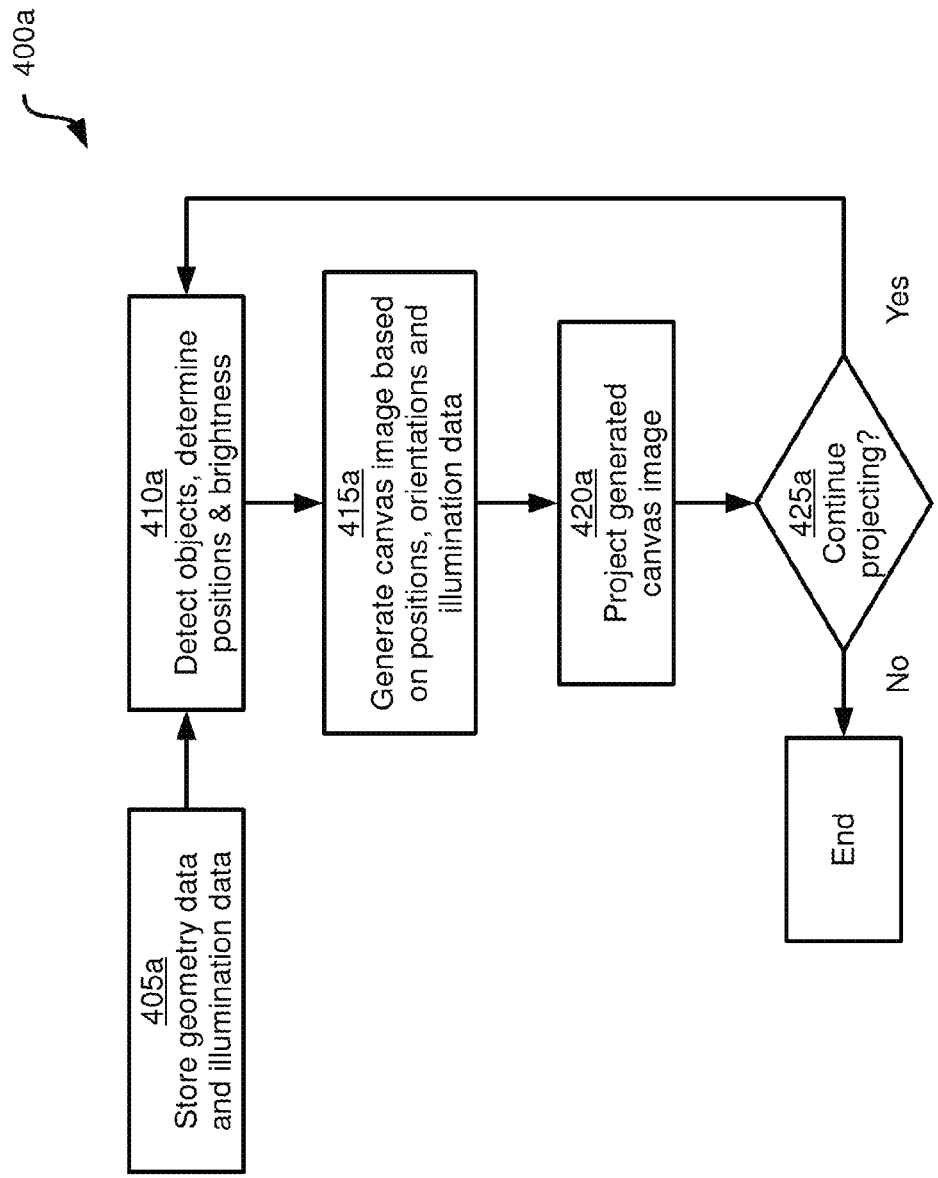
FIG. 15 depicts a method of illuminating objects, according to a non-limiting embodiment.

Referring now to FIG. 15, a method 400*a* of illuminating objects in projection area 112 is depicted. The performance of method 400*a* will be discussed in conjunction with its performance in system 100, although it is contemplated that method 400*a* can also be performed by other suitable systems.

Except as discussed below, the blocks of method 400*a* are performed as described above in connection with method 400. Thus, at block 405 the storage of geometry data 136 is as described previously, and as noted earlier, the storage of image data 138 is replaced with the storage of illumination data 1400. At block 410*a*, the identification and positioning of objects in projection area 112 is performed in the same manner as described above. In addition, at block 410*a* computing device 108 is configured to determine the brightness of each object in the image captured by camera 116, for instance as part of the performance of block 505 shown in FIG. 5. The determination of brightness can be made by examining the captured image, by receiving data from a light meter included in camera 116, or other techniques that will occur to those skilled in the art. The brightness of a particular object or region of an object in projection area 112 is influenced by the incident light from projector 104 and any other ambient sources of light, as well as characteristics of the surface of the object such as (but not limited to) reflectivity, absorption, texture, index of refraction, and so on.

At block 415*a*, processor 124 is configured to generate a canvas image, which will be used by projector 104 to illuminate projection area 112. The canvas image is based on the object positions, orientations and brightnesses determined at block 410*a*, and on illumination data 1400. More specifically, based on the determinations at block 410*a*, processor 124 identifies the regions of the canvas image occupied by each object referenced in illumination data 1400. Thus, processor 124 identifies the region of the canvas image occupied by head 224, the region occupied by torso 204, and the region occupied by all other objects. These regions can be generated based on the transformations applied to model 200 (or other geometry data) at block 410*a*.

Having identified the relevant regions of the canvas image, processor 124 is configured to fill in each region based on the parameters in illumination data 1400 and the brightness of the object in projection area 112 as detected at block 410a. In the present example, processor 124 is configured to fill in the region occupied by head 224 with white at a brightness selected to achieve the target brightness specified in record 1404-2. The selection of brightness for the canvas image can be performed in a variety of ways. For example, processor 124 can be configured to select a brightness for the region of the canvas image according to a predefined function relating target brightness with projector output (for example, a curve plotting target brightness for various levels of projector output obtained by various canvas image brightness levels). Processor 124 can also modify the output of such a function to account for the brightness detected at block 410a. For example, a brightness selected for the canvas image can be increased if the detected brightness is below the target specified in illumination data 1400, or decreased if the detected brightness is above the target specified in illumination data 1400.

Similarly, processor 124 is configured to fill the region occupied by torso 204 with red at a brightness selected to achieve the target brightness specified in record 1404-3, and to fill in the rest of the canvas image with black or null lighting.

Figure 16:
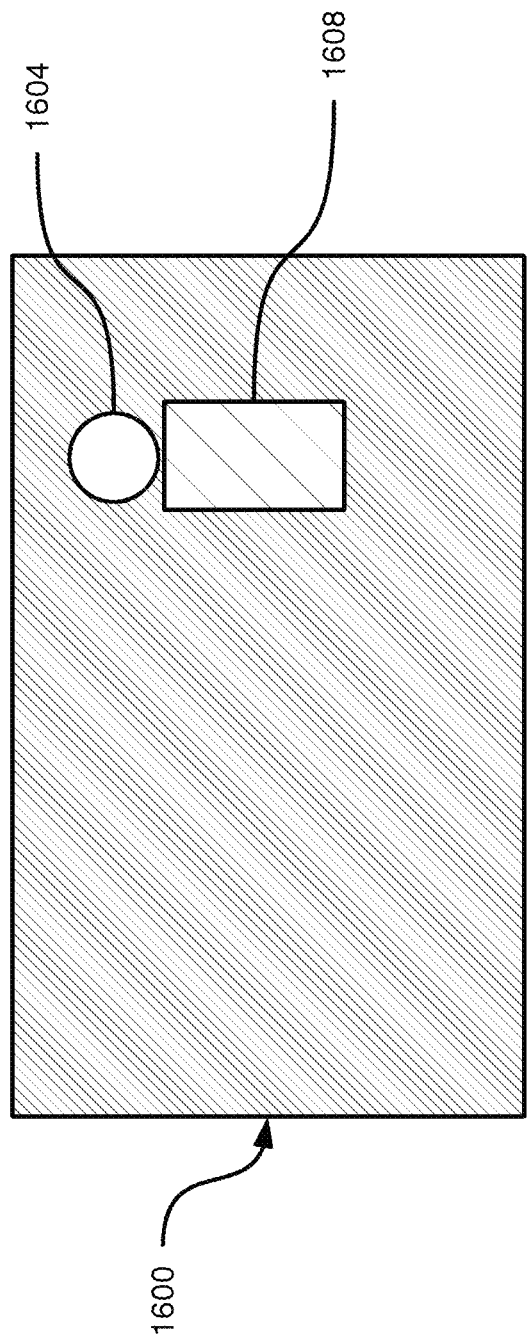
FIG. 16 depicts a canvas image generated at block 415a of the method of FIG. 15, according to a non-limiting embodiment.

Turning to FIG. 16, a canvas image 1600 resulting from the performance of block 415a is shown. As seen in FIG. 16, a region 1604 of canvas image 1600 occupied by head 224 is white in colour and has a brightness selected to illuminate head 224 to a brightness of 200 nits. A region 1608 of canvas image 1600 occupied by torso 204 is red in colour and has a brightness selected to illuminate torso 204 to a brightness of 100 nits. The remainder of canvas image 1600 is black (or, in some examples, transparent), and thus has a brightness of 0.

Figure 17:
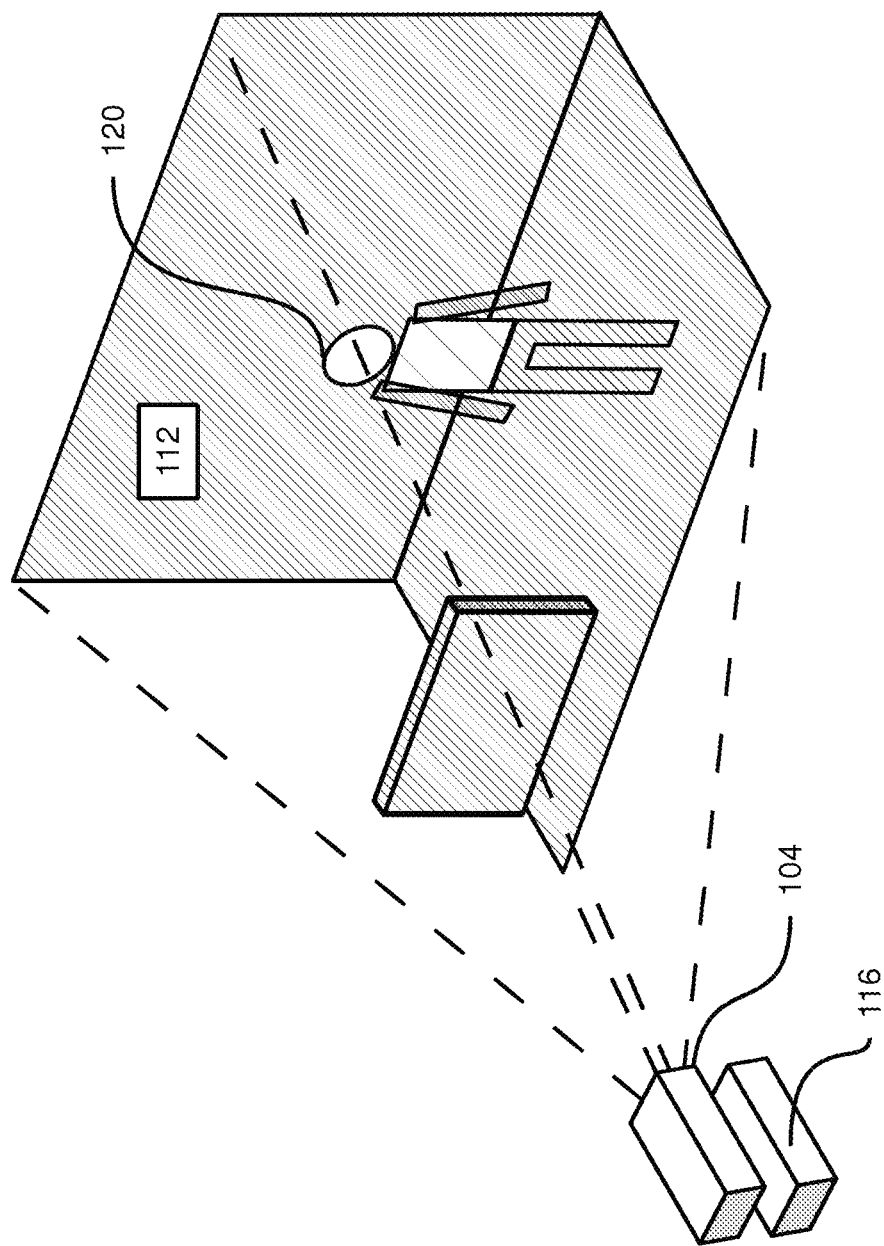
FIG. 17 depicts the performance of block 420a of the method of FIG. 15, according to a non-limiting embodiment.

Referring again to FIG. 15, after generation of canvas image 1600, at block 420a processor 124 is configured to control projector 104 to project canvas image 1600 onto projection area. The results of the performance of block 420a are shown in FIG. 17. As seen in FIG. 17, canvas image 1600 is projected onto projection area 112 by projector 104 (under the control of computing device 108), and the portions discussed in connection with FIG. 16 coincide with the location of the objects corresponding to the geometry data reference in illumination data 1400.

Processor 124 is configured, following the performance of block 420a, to determine at block 425a whether further projection is necessary, as discussed above in connection with block 425.

Still other variations to the above systems and methods will also occur to those skilled in the art.

Those skilled in the art will appreciate that in some embodiments, the functionality of computing device 108 executing application 134 can be implemented using pre-programmed hardware or firmware elements (e.g., application specific integrated circuits (ASICs), electrically erasable programmable read-only memories (EEPROMs), etc.), or other related components.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

We claim:

1. A system for illuminating objects in a projection area, comprising:
a computing device storing:
geometry data defining a digital model of an object; the geometry data including identifiers of parts of the digital model; and
illumination data containing a record having (i) one or more parameters defining characteristics of light to be projected onto the object, and (ii) a reference to the digital model consisting of at least one of the identifiers; the illumination data including an additional record having a null reference to the geometry data;
a light source connected to the computing device and configured to project structured light onto the projection area;
a camera connected to the computing device and configured to capture an image of the projection area during the projection of structured light;
the computing device configured to receive the captured image from the camera and to determine a position and orientation of the object in the projection area by comparing the geometry data to the captured image;
the computing device further configured to generate a canvas image including a region matching the determined position and orientation of the object, the region having a fill defined by the one or more parameters;
the computing device further configured to transmit the canvas image to a projector, for projection onto the projection area, whereby a portion of the object corresponding to the reference in the image data is illuminated according to the one or more parameters.

2. The system of claim 1, the computing device configured to determine a position of the object by detecting signatures in the captured image corresponding to the digital model, and comparing the signatures to the geometry data.

3. The system of claim 2, the computing device configured to apply transformations to the digital model such that the transformed digital model matches the signatures;
the computing device further configured to generate the region of the canvas image based on at least one of the transformations.

4. The system of claim 1, wherein the light source is a component of the projector.

5. The system of claim 1, wherein the projection area contains at least one of a plurality of objects; and wherein the geometry data defines a plurality of digital models corresponding to the plurality of objects;
the computing device configured to detect signatures corresponding to at least one of the plurality of digital models in the captured image.

6. The system of claim 1, wherein the one or more parameters include a target brightness parameter and a colour parameter.

7. The system of claim 6, further comprising detecting a brightness of the object, and selecting a fill brightness for the region based on the target brightness and the detected brightness.

8. A computing device for use in a system for illuminating objects in a projection area, the computing device comprising:
a memory storing:
geometry data defining a digital model of an object; the geometry data including identifiers of parts of the digital model; and
illumination data containing a record having (i) one or more parameters defining characteristics of light to be projected onto the object, and (ii) a reference to the digital model consisting of at least one of the identifiers; the illumination data including an additional record having a null reference to the geometry data;

a data interface configured to communicate with a light source, a projector and a camera; and a processor interconnected with the memory and the data interface, the processor configured to:

control the light source to project structured light onto the projection area;

control the camera to capture an image of the projection area during the projection of structured light;

receive the captured image from the camera, and determine a position and orientation of the object in the projection area by comparing the geometry data to the captured image;

generate a canvas image including a region matching the determined position and orientation of the object, the region having a fill defined by the one or more parameters; and transmit the canvas image to a projector, for projection onto the projection area, whereby a portion of the object corresponding to the reference in the illumination data is illuminated according to the one or more parameters.

9. The computing device of claim 8, the processor configured to determine a position of the object by detecting signatures in the captured image corresponding to the digital model, and comparing the signatures to the geometry data.

10. The computing device of claim 9, the processor configured to apply transformations to the digital model such that the transformed digital model matches the signatures;

the processor further configured to generate the region of the canvas image based on at least one of the transformations.

11. The computing device of claim 8, wherein the light source is a component of the projector.

12. The computing device of claim 8, wherein the projection area contains at least one of a plurality of objects; and wherein the geometry data defines a plurality of digital models corresponding to the plurality of objects;

the processor configured to detect signatures corresponding to at least one of the plurality of digital models in the captured image.

13. The computing device of claim 8, wherein the one or more parameters include a target brightness parameter and a colour parameter.

14. The computing device of claim 8, wherein the geometry data includes identifiers of parts of the digital model; and wherein the reference in the illumination data consists of at least one of the identifiers.

15. The computing device system of claim 13, the processor further configured to detect a brightness of the object, and select a fill brightness for the region based on the target brightness and the detected brightness.

16. The computing device of claim 14, wherein at least one of the one or more parameters is dynamically variable.

17. A method of illuminating objects in a projection area, comprising:

storing, in a memory of a computing device:

geometry data defining a digital model of an object; the geometry data including identifiers of parts of the digital model; and illumination data containing a record having (i) one or more parameters defining characteristics of light to be projected onto the object, and (ii) a reference to the digital model consisting of at least one of the identifiers; the illumination data including an additional record having a null reference to the geometry data;

controlling a light source connected to the computing device to project structured light onto the projection area;

controlling a camera connected to the computing device to capture an image of the projection area during the projection of structured light;

receiving the captured image at the computing device from the camera and determining a position and orientation of the object in the projection area by comparing the geometry data to the captured image;

generating a canvas image at the computing device, including a region matching the determined position and orientation of the object, the region having a fill defined by the one or more parameters;

transmitting the canvas image to a projector connected to the computing device, for projection onto the projection area, whereby a portion of the object corresponding to the reference in the illumination data is illuminated according to the one or more parameters.

18. A non-transitory computer readable medium storing a plurality of computer readable instructions executable by a processor of a computing device, for causing the processor to perform a method of illuminating objects in a projection area, the method comprising:

storing, in a memory of a computing device:

geometry data defining a digital model of an object; the geometry data including identifiers of parts of the digital model; and illumination data containing a record having (i) one or more parameters defining characteristics of light to be projected onto the object, and (ii) a reference to the digital model consisting of at least one of the identifiers; the illumination data including an additional record having a null reference to the geometry data;

controlling a light source connected to the computing device to project structured light onto the projection area;

controlling a camera connected to the computing device to capture an image of the projection area during the projection of structured light;

receiving the captured image at the computing device from the camera and determining a position and orientation of the object in the projection area by comparing the geometry data to the captured image;

generating a canvas image at the computing device, including a region matching the determined position and orientation of the object, the region having a fill defined by the one or more parameters;

transmitting the canvas image to a projector connected to the computing device, for projection onto the projection area, whereby a portion of the object corresponding to the reference in the illumination data is illuminated according to the one or more parameters.

* * * * *